Mar. 27, 1923.

J. H. BECKER

GREASE PLUG

Filed Mar. 3, 1921

1,449,934

Inventor
John H. Becker
By Day, Oberlin & Day
Attorneys

Patented Mar. 27, 1923.

1,449,934

UNITED STATES PATENT OFFICE.

JOHN H. BECKER, OF MANSFIELD, OHIO.

GREASE PLUG.

Application filed March 3, 1921. Serial No. 449,299.

*To all whom it may concern:*

Be it known that I, JOHN H. BECKER, a citizen of the United States, and a resident of Mansfield, county of Richland, and State of Ohio, have invented a new and useful Improvement in Grease Plugs, of which the following is a specification, the principle of the invention being herein explained and the best mode in which I have contemplated applying that principle, so as to distinguish it from other inventions.

The present device relates to grease plugs and more particularly, to grease plugs adapted to be used on the connecting rods of locomotives and the like, where the rod is provided with an integrally formed boss or housing adapted to receive the grease plug or cup proper. The present cup is particularly adapted for use on locomotives and is so arranged that it is not easily lost nor can the threads be stripped or crossed in mounting the cup in place. Further advantage is the ease in removing and refilling the present cup. Provision is made so that the cup can be normally seated in the boss on the rod and the cup is provided with an unthreaded end portion adapted to correctly seat the cup in position so that it will engage the threads on the boss without fear of crossing or stripping these threads. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
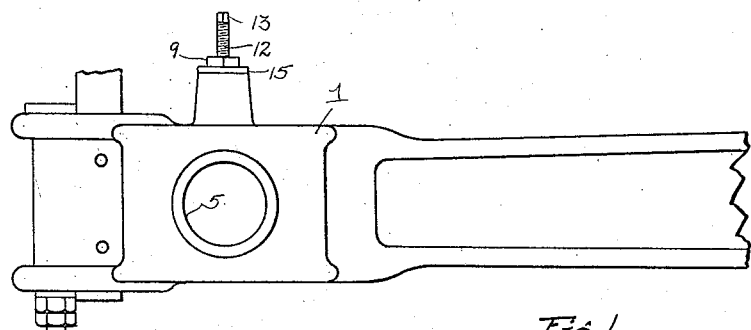
Figure 2:
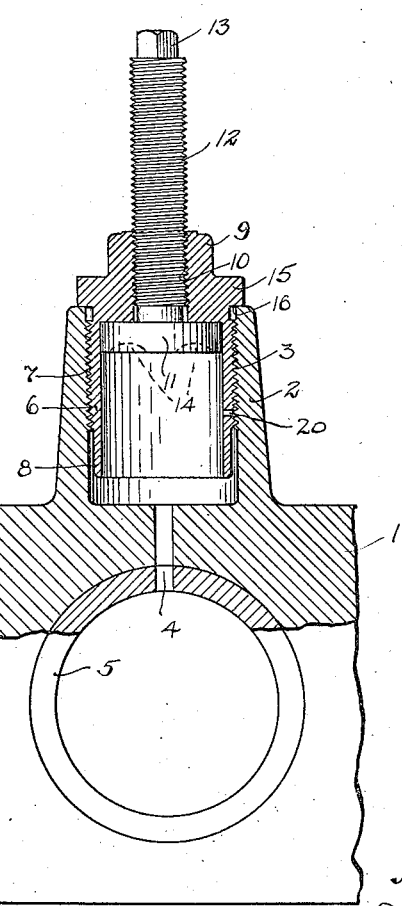

Fig. 1 is a side elevation of the engine rod showing the present cup in place thereon; and Fig. 2 is a cross sectional view through the cup and rod.

As illustrated, the engine rod 1 is provided with an upstanding boss 2 which is interiorly threaded as at 3 for the upper portion of its length and this boss is connected by a suitable aperture 4 with the bearing 5 in the rod. The present grease plug is essentially a hollow metal cylinder 6 having its exterior threaded as at 7 for the major portion of its length but having an extending unthreaded end 8 which is of substantially the same diameter as the bottom of the threads so that this unthreaded portion fits snugly within the threads 3 on the boss and acts as a guide when the cup is placed in position. At the upper end the cup is provided with an integral nut portion 9 adapted to be engaged by a wrench or the like and this nut portion is provided with a centrally located, threaded aperture 10. Within the grease cup is mounted a piston or plunger 11 which is connected to a suitable threaded rod 12 adapted to engage the threaded aperture 10 in the cap and this rod is provided with a squared end 13 so that the piston can be moved downwardly to expel the grease. The lower face of the plunger is provided with one or more recesses 14 acting as keys for the grease and tending to prevent accidental turning of the plunger.

This grease cup is adapted to be filled with the plunger 11 in its upper or retracted position and then mounted in the boss on the connecting rod. By then screwing down on the plunger rod the grease may be readily expelled through the aperture into the bearing which is to be supplied with lubricant.

In the form of grease cup in common use by the railroads, the cylindrical grease cup is usually provided with only a few threads and is really merely a cap or plug. The boss itself acts as the real grease cup and is filled with grease after which the plug is applied and then by screwing the plug downwardly, the grease in the boss is forced into the bearing. When a grease plug of this type is used on a locomotive, and the boss is filled with grease, it is hard to make the threads on the plug and boss meet correctly and many threads are crossed and stripped in placing the grease cups on the rods. When this happens the cups easily work loose and are lost and the total loss on many railroads runs into thousands of plugs in the course of a year.

In the present grease cup the lower unthreaded end of the cup acts as a guide when the cup is first placed in position and thus the threads meet and engage correctly so that the cup may be screwed down tight against the boss. As shown, the present cup is provided with an annular top 15 having a shoulder 16 adapted to fit down snugly against the upper surface 17 of the boss and the cup when in its position within the boss, extends almost to the bottom of the same. As the present cup is filled with grease before placing it into position, the boss itself does not receive grease so that the threads on the boss are never clogged and the liability of crossing the threads and stripping the same, is almost entirely eliminated. No locking nut is needed with the present device because the shoulder on the cup contacts with the top of the boss and locks the cup in position when it is screwed down tight. As the present cup is threaded over the major portion of its length there are sufficient threads so that the cup may be screwed down very tight into place without danger of breaking or stripping the threads.

In the ordinary type of grease cup or plug, the grease must be expelled by screwing the plug into position and this means that the plug must be screwed down against such a pressure that a wrench must be used, and thus, if the threads are not correctly engaged, they will be cut or stripped in trying to force the plug into place. In the present cup this difficulty is overcome because the cup itself holds the grease and the cavity in the boss merely receives the cup, and therefore the threads are not liable to become choked and they may be engaged correctly and the cup screwed down into place before any grease is expelled into the bearing.

I have also shown an aperture 20 near the bottom of the plug but above a few threads to allow hot gases to escape before the plug is completely removed, to prevent the plug from blowing out when unscrewed, and allowing boiling hot grease to be blown on the user, as happens with present solid types of plugs now in general use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A grease cup for locomotive connecting rods and the like, comprising a hollow cylinder adapted to be threaded in the boss on the bearing to be lubricated and having a smooth interior, said cylinder having its lower end unthreaded to serve as a guide and being provided at its upper end with an integral cap having a threaded aperture and an overhanging shoulder adapted to seat against the said boss; and a plunger slidably fitted in said cylinder and having a threaded stem engaging such aperture, the lower face of said plunger having a recess adapted to rotatively engage with the grease filling said cylinder.

2. A grease cup for locomotive connecting rods and the like, comprising a hollow cylinder adapted to be threaded in the boss on the bearing to be lubricated and having a smooth interior, said cylinder having its lower end unthreaded to serve as a guide and being provided at its upper end with an integral cap having a threaded aperture and an overhanging shoulder adapted to seat against said boss, and a plunger slidably fitted in said cylinder and having a threaded stem engaging such aperture, the lower face of said plunger being recessed to engage with the grease filling said cylinder, said cylinder also having a lateral aperture through the threaded portion of its wall adapted to be cleared by said plunger when the latter is in raised position.

Signed by me, this 26th day of February, 1921.

JOHN H. BECKER.